3,320,186
POLYVINYLCYANOPYRIDINE DERIVATIVES
AND THEIR USE IN THE PREPARATION OF
AMPHOTERIC ION EXCHANGE RESINS
Wayne E. Feely, Rydal, Pa., assignor to Rohm & Haas
Company, Philadelphia, Pa., a corporation of Delaware
No Drawing. Filed Jan. 9, 1963, Ser. No. 250,224
17 Claims. (Cl. 260—2.1)

This invention relates to a new process for introducing cyano groups into aromatically unsaturated nitrogen-containing heterocyclic polymers in which the nitrogen atom is a member of a six-membered ring, the said polymer containing a multiplicity of heterocyclic rings, the said ring being part of the polymer backbone or pendent thereon. These aromatically unsaturated nitrogen-containing hetereocyclic compounds will, for ease of reference, be referred to hereinafter as "nitrogen heterocycles."

As set forth in U.S. Patents Nos. 2,971,002, 2,991,285, and 3,046,278, cyano groups can be introduced as ring substituents on nitrogen heterocycles by a sequence of reactions comprising the conversion of the nitrogen heterocycle to its N-oxide by oxidation with hydrogen peroxide in acetic acid, the conversion of the N-oxide to the N-alkoxy nitrogen heterocycle methyl sulfate salt, and the treatment of said salt with a source of cyanide ion to give the desired cyano-substituted nitrogen heterocycle.

It has now been found that this sequence of reactions may be applied to water-insoluble polymers containing a multiplicity of nitrogen heterocycle rings to yield cyano-substituted nitrogen heterocyclic polymers which are extremely difficult or impossible to prepare from the appropriately substituted monomeric materials.

For example, it is well-known that vinylpyridine reacts spontaneously with aqueous cyanide solutions to give 3-pyridylpropionitrile (Doering and Weil, J. Am. Chem. Soc., 69, 2463 (1947)), thus precluding the preparation of cyanovinylpyridines by application of the cyanation reaction sequence described above. Even if it were possible to prepare cyanovinyl nitrogen heterocycles, it is doubtful that they would be useful in preparing a wide variety of cyanovinyl nitrogen heterocyclic polymers because the electron withdrawing cyano group present on these monomers would render the vinyl group extremely reactive and thus difficult to handle and copolymerize.

It has been found that the most direct method of preparing cyano-substituted polyvinyl nitrogen heterocyclic polymers and copolymers is by the polymerization or copolymerization of vinyl-substituted nitrogen heterocyclic monomers to give a polymer containing a multiplicity of nitrogen heterocyclic groups and then performing the sequence of steps of the cyanation procedure, namely, oxidation of the said polymer with hydrogen peroxide in acetic acid to the polymeric N-oxide, reaction with a dialkyl sulfate to give the polymeric N-alkoxy nitrogen heterocyclic methyl sulfate salt, and finally reaction with a source of cyanide ions to give a polymeric cyano-substituted nitrogen heterocycle.

This method of preparing cyano-substituted nitrogen heterocyclic polymers may be applied to homopolymers and copolymers derived from nitrogen heterocyclic monomers including 2-vinylpyridine, 3-vinylpyridine, 4-vinylpyridine, 2-methyl-6-vinylpyridine, 5-methyl-2-vinylpyridine, 4-methyl-2-vinylpyridine, 3-methyl-2-vinylpyridine, 2-methyl-3-vinylpyridine, 4-methyl-3-vinylpyridine, 5-methyl-3-vinylpyridine, 2-methyl-5-vinylpyridine, 2-methyl-4-vinylpyridine, 3-methyl-4-vinylpyridine, 4-vinylquinoline, 3-vinylisoquinoline, 3-ethyl-5-vinylpyridine, 3,5-divinylpyridine, 2-phenyl-4-vinylpyridine, and 4(4'-vinylphenyl)pyridine. In general, the nitrogen heterocyclic rings in the polymer must have available for introduction of the cyano group at least one of the positions 2, 4 or 6.

Suitable copolymers may be prepared by copolymerizing any of these or similar nitrogen heterocyclic monomers with such monomers as styrene, methylmethacrylate, ethyl methacrylate, butylmethacrylate, dodecylmethacrylate, methyl acrylate, ethyl acrylate, butyl acrylate, dodecyl acrylate, α-methylstyrene, acrylonitrile, vinyltoluene, divinylbenzene, 2-hydroxyethyl methacrylate and methacrylonitrile.

The said homopolymers and copolymers may be prepared by any of the standard polymerization techniques such as in bulk, in suspension, in emulsion, or by polymerization in solvent.

The cyano nitrogen heterocyclic polymers are useful in preparing coating resins with improved adhesion, flocculating aids for water treatment, and by hydrolysis of the cyano nitrogen heterocyclic polymer to the corresponding carboxylic acid polymers as water-soluble coatings, as flocculating aids, in adherent floor polishes that are removable by basic solutions, as lubricant additives to inhibit corrosion and improve viscosity index, and particularly in the preparation of amphoteric ion exchange resins.

The amphoteric ion exchange resins of the present invention are useful as buffering agents and complexing agents. They may also be employed with a mixture of pharmaceuticals which are to provide slow release of said pharmaceuticals since it is possible to attach an anionic pharmaceutical to the anion portion of the polymer and a cationic pharmaceutical to the carboxyl group. Naturally, anions and cations can be removed from solution on a once-use basis, but a special regeneration technique must be employed if it is desired to regenerate the resin.

As set forth hereinbefore, the vinylpyridine must have at least one of the 2, 4 and 6 positions open for substitution in order to be effective in the subsequent cyanation reaction. Substituted vinylpyridines may be used, it being understood that the substitutents do not interfere with the cyanation process. Thus, alkyl-substituted vinylpyridines react under essentially the same reaction conditions as the unsubstituted nitrogen heterocycles. The vinylpyridines can be poly-substituted. Cyano-substituted vinylpyridines can be used, thus yielding a dicyano-substituted polymer following the subsequent cyanation reaction.

In order to increase the insolubility and chemical and physical resistance of the vinylpyridine ion exchange resin, it is preferred to cross-link by means of copolymerizing with a copolymerizable polyvinyl monomer. From 0 to 15 parts by weight of a polyvinyl compound per 100 to 85 parts by weight of vinylpyridine is employed.

Typical cross-linking compounds are the following: divinylpyridine, divinyltoluenes, diallyl phthalate, ethylene glycol diacrylate, ethylene glycol dimethacrylate, divinylxylene, divinylethylbenzene, divinylsulfone, polyvinyl or polyallyl ethers of glycol, of glycerol, of pentaerythrito, of mono-, or dithio- derivatives of glycols, and of resorcinol; divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N'-methylenediacrylamide, N,N'-methylene dimethacrylamide, N,N'-ethylenediacrylamide, 1,2-di(-methylmethylene sulfonamido)- ethylene, trivinylnaphthalene, and polyvinylanthracenes.

Particularly preferred polyvinyl monomers, commonly known as "cross-linkers," include the following: polyvinylaromatic hydrocarbons, such as divinylbenzene and trivinylbenzene, glycol dimethacrylates, such as ethylene glycol dimethacrylate, and polyvinyl ethers of polyhydric alcohols, such as divinoxyethane and trivinoxypropane.

Depending on the physical properties and capacities required of these vinylpyridine resins, a terpolymer may be employed which consists of the cross-linker, the vinylpyridine and another monoethylenically unsaturated copolymerizable monomer. Since it is generally true, however, that the addition of the third monomer detracts from the anion exchange capacity, it is preferred that the amount of the third monomer be kept to a minimum and from 0 to 50 parts by weight per 100 parts of the monomer mixture may be employed. If it is desired to increase the carboxylic capacity at the expense of the anion exchange capacity, an acrylate or methacrylate ester may be employed as the third monomer. Similarly, acrylonitrile or methacrylonitrile can be employed and subsequent hydrolysis will produce additional carboxyl groups. Thus, it is possible to vary the ratio of anion exchange groups to cation exchange groups by manipulation of the ratios of the two monoethylenically unsaturated monomers employed.

It is possible to prepare these copolymers by any method of free radical polymerization, but it is preferred to employ suspension copolymerization when it is intended to use the copolymers for ion exchange purposes.

The term "suspension polymerization" is a term well-known to those skilled in the art and comprises suspending droplets of the monomer or monomer mixture in a medium in which the monomer or monomer mixture is substantially insoluble. This may be accomplished by adding the monomer or monomer mixture with any additives to the suspending medium which contains a dispersing or suspending agent, such as, for instance, in the case of an aqueous suspending medium, the ammonium salt of a styrene-maleic anhydride copolymer, carboxymethyl cellulose, bentonite or a magnesium silicate dispersion. When this medium is agitated, the monomer phase disperses into fine droplets, the size of the droplets depending on a number of factors, such as amount of dispersing agent, type and rate of agitation, etc. Agitation is continued until polymerization is complete. The polymerized droplets, generally termed "beads," are then separated from the suspending medium and further processed, if desired.

The suspension polymerization of ethylenically unsaturated monomers or monomer mixtures, particularly those employed in the process of the present invention, generally uses aqueous suspending media.

When employing water-soluble ethylenically unsaturated monomers, however, it is not possible to use aqueous suspending media unless the solubility of the monomers is such that they can be salted out. If it is not possible to salt out the monomers, then compounds in which the monomers are insoluble must be employed as suspending media. The compounds used must be chemically inert in the sense that they do not interfere with the polymerization reaction. Aliphatic hydrocarbons are typical of such media.

It is well-known that oxygen acts as an inhibitor of free radical polymerizations and should, therefore, be excluded. The preferred embodiments of this invention effect polymerization under substantially anarobic conditions.

Suitable catalysts which provide free radicals which function as reaction initiators include benzoyl peroxide, tert-butyl hydroperoxide, cumene peroxide, tetralin peroxide, acetyl peroxide, caproyl peroxide, tert-butyl perbenzoate, tert-butyl diperphthalate, methyl ethyl ketone peroxide, etc.

The amount of peroxidic catalyst required is roughly proportional to the concentration of the mixture of monomers. The usual range is 0.01% to 3% of catalyst with reference to the weight of the monomer mixture. The preferred range is from 0.2% to 1.5%. The optimum amount of catalyst is determined in large part by the nature of the particular monomers selected, including the nature of the impurities which may accompany said monomers.

Another suitable class of free radical generating compounds are the azo catalysts. There may be used, for example, azodiisobutyronitrile, azodiisobutyramide, azobis($\alpha,\alpha$-dimethylvaleronitrile), azobis($\alpha$-methylbutyronitrile), dimethyl, diethyl, or dibutyl azobis(methylvalerate). These and other similar azo compounds serve as free radical initiators. They contain a —N=N— group attached to aliphatic carbon atoms, at least one of which is tertiary. An amount of 0.01% to 2% of the weight of monomer or monomers is usually sufficient.

Another method of effecting copolymerization of the compositions of the present invention is by subjecting the reaction mixture to ultraviolet light in the presence of suitable catalysts at ambient or slightly elevated temperatures. Such catalysts include benzoin, azoisobutyronitrile, etc.

The beads so formed are treated with hydrogen peroxide as set forth by Ochiai, J. Org. Chem. 18, 548 (1953). The N-oxide compound so produced is reacted with an alkyl salt to produce the N-alkoxyquaternary ammonium compound. Because of the ready availability and low cost, dimethyl sulfate represents the preferred alkyl salt, although alkyl iodides and bromides can also be employed.

The N-alkoxy quaternary ammonium compound, which is water-insoluble, is contacted with an aqueous solution of a soluble cyanide salt. Sodium, potassium and ammonium cyanides are the preferred salts, with sodium cyanide being particularly preferred because of its ready availability and relatively low cost. Although, theoretically, one mole of cyanide should react completely with one "mole" of the pyridine N-alkoxyalkyl salt, it is preferred to use an excess of cyanide and the ratio of cyanide to mole of pyridine N-alkoxyalkyl salt is from 1 to 2 to 1. The term "mole" of the pyridine N-alkoxyalkyl salt refers to one pyridine unit in the polymer chain.

The reaction can be effected over a wide temperature range but it is preferred to react in the range of $-10°$ C. to $100°$ C.

The following example sets forth certain well-defined embodiments of the application of this invention. They are not, however, to be considered as limitations thereof, since many modifications may be made without departing from the spirit and scope of this invention.

EXAMPLE

*Preparation of resin N-oxide*

Eighty parts of a copolymer prepared by the copolymerization of 15 parts of divinylbenzene, 68 parts of 2-methyl-5-vinylpyridine in the presence of 17 parts of isooctane was suspended in a solution of 200 parts of hydrogen peroxide dissolved in 600 parts of glacial acetic acid. The mixture was slowly stirred and heated to 90° C. for six hours. The resin was then separated from the solution by filtration, washed with water, and stirred in 1000 parts of 0.1 N sodium hydroxide solution at 60° C. for 2 hours. The resin was then separated from the solution and washed with cold water for one hour. After air-drying, the resin was placed in a vacuum desiccator and dried under vacuum (0.5 mm.) over phosphorus pentoxide overnight. Seventy-two parts of dried resin were obtained.

*Preparation of the resin N-methoxymethyl sulfate quaternary salt*

The seventy-two parts of resin N-oxide from the previous experiment was treated with 130 parts of dimethyl sulfate at 92° C. for four hours. The resin was separated from the solution by filtration and washed with 1000 parts of anhydrous methanol. One hundred and twenty-eight parts (air-dried basis) of product were obtained.

Resin nitrile

The one hundred twenty-eight parts resin from the previous reaction was suspended in a solution of 196 parts of sodium cyanide dissolved in 500 parts of water, and was slowly stirred at room temperature for three days. The mixture was then heated to 60° C. for two hours and the resin then removed by filtration. The resin was washed with water and air-dried. Seventy-seven parts of the resin nitrile were obtained.

Resin carboxylic acid

The seventy-seven parts of resin nitrile from the previous reaction was suspended in 1000 parts of hydrochloric acid and the mixture was refluxed overnight. The resin was separated by filtration and washed with 1000 parts of sodium bicarbonate and then with cold water for two hours. Seventy-one parts of resin were obtained (air-dried basis).

I claim:

1. A process for the introduction of cyano groups into the nucleus of the pyridine rings of a polymer or copolymer prepared from 85 parts to 100 parts by weight of a vinylpyridine with from 0 to 15 parts by weight of a polyvinyl compound, the said pyridine rings having available for substitution one or more of the positions 2, 4 and 6, said pyridine rings having substituent groups selected from the group consisting of 0 to 2 lower alkyl groups having 1 to 4 carbon atoms, which comprises reacting the water insoluble N-alkoxy quaternary inorganic salts of said polymer, in which the N-alkoxy groups have 1 to 4 carbon atoms, with an alkali metal cyanide ion at a temperature of from −10° C. to 100° C.

2. A process as set forth in claim 1 in which the reaction between the N-alkoxy quaternary inorganic salt in which the alkoxy group has 1 to 4 carbon atoms and the compound which provides cyanide ion is carried out in the presence of a solvent selected from the group consisting of water, methanol, ethanol, 1,4-dioxane and mixtures thereof.

3. A process as set forth in claim 1 in which the reaction between the N-alkoxy quaternary inorganic salt of the polymer, in which the N-alkoxy group has 1 to 4 carbon atoms, and the compound which provides the alkali metal cyanide ion is carried out in the presence of water.

4. A process as set forth in claim 1 in which the N-alkoxy quaternary salt of the polymer is prepared by reacting the vinylpyridine polymer or copolymer as set forth in claim 1 with hydrogen peroxide to form the N-oxide and subsequently reacting the N-oxide at a temperature of 50° to 100° C. with an alkyl inorganic salt, the alkyl groups having 1 to 4 carbon atoms, and recovering the N-alkoxy vinylpyridinium polymer or copolymer so formed.

5. A process as set forth in claim 4 in which the alkyl salt is a dialkyl sulfate and the alkyl groups of the sulfate contain 1 to 4 carbon atoms.

6. A process as set forth in claim 5 in which the dialkyl sulfate is dimethyl sulfate.

7. A process as set forth in claim 1 in which the compound which provides cyanide ion is sodium cyanide.

8. A process as set forth in claim 1 in which the compound which provides cyanide ion is potassium cyanide.

9. A process as set forth in claim 1 in which the compound which provides cyanide ion is ammonium cyanide.

10. A process for the preparation of amphoteric ion exchange resins having weakly basic groups and carboxyl groups which comprises (A) preparing a copolymer by free radical polymerizing
  (I) 85 to 100 parts by weight of a vinylpyridine having at least one of the 2, 4 and 6 positions available for substitution, with
  (II) 0 to 15 parts by weight of a polyvinyl compound,
(B) preparing the N-oxide of the copolymer by reacting with hydrogen peroxide,
(C) quaternizing the N-oxide by reacting it with an alkylating agent selected from the group consisting of alkyl halides and dialkyl sulfates,
(D) reacting the resultant quaternary with a compound which provides alkali metal cyanide ion,
(E) isolating the resultant copolymer containing cyano groups, and
(F) hydrolyzing the cyano groups to form carboxyl groups.

11. Products of the process of claim 10.

12. A process for the preparation of amphoteric ion exchange resins having strongly basic groups and carboxyl groups which comprises quaternizing the products of claim 11 with an alkylating agent selected from the group consisting of alkyl halides and dialkyl sulfates.

13. Products of the process of claim 12.

14. Polyvinylpyridine carboxylic acid polymers.

15. Cross-linked polyvinylpyridine carboxylic acid copolymers in which the cross-linking agent is a member of the class consisting of a polyvinyl aromatic hydrocarbon, a glycol diacrylate, a glycol dimethacrylate, a polyvinyl ether of a polyhydric alcohol, divinylpyridine, a divinyl toluene, diallyl phthalate, divinylxylene, divinylethylbenzene, divinylsulfone, a polyvinyl ether of glycol, a polyallyl ether of glycol, a polyvinyl ether of glycerol, a polyallyl ether of glycerol, a polyvinyl ether of pentaerythritol, a polyallyl ether of pentaerythritol, a monothio-derivative of glycol, a dithio-derivative of glycol, a monothio-derivative of resorcinol, a dithio-derivative of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N′ - methylenediacrylamide, N,N′-methylene dimethylene dimethacrylamide, N,N′-ethylenediacrylamide, 1,2-di(α-methylene sulfonamide)-ethylene, trivinylnaphthalene, and a polyvinylanthracene.

16. Products as set forth in claim 15 in which the cross-linking agent is divinylbenzene.

17. Products as set forth in claim 15 in which the cross-linking agent is trivinylbenzene.

References Cited by the Examiner

UNITED STATES PATENTS

| | | | |
|---|---|---|---|
| 2,540,984 | 2/1951 | Jackson | 260—2.1 |
| 2,611,763 | 9/1952 | Jones | 260—2.1 |
| 2,971,002 | 2/1961 | Feely | 260—294.8 |
| 3,022,253 | 2/1962 | McMaster | 260—2.1 |
| 3,046,278 | 7/1962 | Feely | 260—294.8 X |
| 3,242,138 | 3/1966 | Van Paesschen | 260—2.1 |

WILLIAM H. SHORT, *Primary Examiner.*

C. A. WENDEL, *Assistant Examiner.*